(12) United States Patent
Choi et al.

(10) Patent No.: US 9,230,176 B2
(45) Date of Patent: Jan. 5, 2016

(54) METHOD OF DETECTING CAMERA TAMPERING AND SYSTEM THEREOF

(71) Applicant: HANWHA TECHWIN CO., LTD., Changwon-Si (KR)

(72) Inventors: Eun-Ji Choi, Changwon (KR); Jeong-Eun Lim, Changwon (KR); Il-Kwon Chang, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 304 days.

(21) Appl. No.: 13/796,107

(22) Filed: Mar. 12, 2013

(65) Prior Publication Data

US 2014/0078307 A1 Mar. 20, 2014

(30) Foreign Application Priority Data

Mar. 14, 2012 (KR) .................. 10-2012-0026195

(51) Int. Cl.
*G06K 9/00* (2006.01)
*G06T 7/20* (2006.01)
*H04N 7/18* (2006.01)

(52) U.S. Cl.
CPC .............. *G06K 9/00771* (2013.01); *G06T 7/20* (2013.01); *G06T 7/2006* (2013.01); *H04N 7/181* (2013.01); *G06T 2207/10016* (2013.01); *G06T 2207/10024* (2013.01); *G06T 2207/20076* (2013.01); *G06T 2207/20144* (2013.01); *G06T 2207/30232* (2013.01)

(58) Field of Classification Search
None
See application file for complete search history.

(56) References Cited

U.S. PATENT DOCUMENTS

| 8,073,261 | B2 * | 12/2011 | Skans ........................ 382/209 |
| 8,094,714 | B2 * | 1/2012 | Nakazato et al. ........ 375/240.01 |
| 8,760,526 | B2 * | 6/2014 | Kotani ...................... 348/208.4 |
| 2003/0123541 | A1 * | 7/2003 | Jun et al. ................. 375/240.08 |
| 2003/0133591 | A1 * | 7/2003 | Watanabe et al. ............ 382/100 |
| 2010/0128126 | A1 * | 5/2010 | Takeuchi ..................... 348/143 |
| 2010/0134640 | A1 * | 6/2010 | Kuo et al. ................. 348/208.6 |
| 2010/0295954 | A1 | 11/2010 | Kotani |
| 2011/0064315 | A1 * | 3/2011 | Thomas et al. .............. 382/199 |
| 2011/0193941 | A1 * | 8/2011 | Inaba et al. .................... 348/46 |

FOREIGN PATENT DOCUMENTS

| EP | 1 936 576 B1 | 8/2011 |
| JP | 4629090 B2 | 11/2010 |
| KR | 1995-0010639 A | 4/1995 |

(Continued)

*Primary Examiner* — Jay Au Patel
*Assistant Examiner* — Reza Aghevli
(74) *Attorney, Agent, or Firm* — Sughrue Mion, PLLC

(57) ABSTRACT

A method of detecting camera tempering and a system therefor are provided. The method includes: performing at least one of following operations: (i) detecting a size of a foreground in an image, and determining whether a first condition, that the size exceeds a first reference value, is satisfied, (ii) detecting change of a sum of the largest pixel value differences among pixel value differences between adjacent pixels in selected horizontal lines of the image, according to time, and determining whether a second condition, that the change lasts for a predetermined time period, is satisfied, and (iii) adding up a plurality of global motion vectors with respect to a plurality of images, and determining whether a third condition, that a sum of the global motion vectors exceeds a second reference value, is satisfied; and determining occurrence of camera tempering if at least one of the corresponding conditions is satisfied.

20 Claims, 9 Drawing Sheets

(56) References Cited

FOREIGN PATENT DOCUMENTS

| KR | 1998-066600 | A | 10/1998 |
| KR | 10-0411347 | B1 | 12/2003 |
| KR | 10-0441963 | B1 | 7/2004 |
| KR | 10-0853959 | B1 | 8/2008 |
| KR | 10-2010-0126195 | A | 12/2010 |
| KR | 10-2011-0039516 | A | 4/2011 |
| WO | 2009-087816 | A1 | 7/2009 |

* cited by examiner

METHOD OF DETECTING CAMERA TAMPERING AND SYSTEM THEREOF

CROSS-REFERENCE TO RELATED PATENT APPLICATION

This application claims priority from Korean Patent Application No. 10-2012-0026195, filed on Mar. 14, 2012, in the Korean Intellectual Property Office, the disclosure of which is incorporated herein in its entirety by reference.

BACKGROUND

1. Field

Methods and apparatuses consistent with exemplary embodiments of the inventive concept relate to detecting camera tampering, and more particularly, detecting camera tampering, if a foreground ratio exceeds a reference value, a pixel value difference in an image lasts more than a predetermined time, or a global motion value exceeds a reference value.

2. Description of the Related Art

An image surveillance system obtains images from cameras installed at many places where surveillance is necessary, and transmits the images to a monitor or stores the images in a storage to monitor them in real-time and to review them afterwards.

Recently, as demands for image surveillance systems have generally increased in society as a whole, in order to solve a problem of manpower shortage for managing an increased number of image surveillance systems, intelligent image analyzing techniques in which detecting motion in an image, tracing an object in the image, or face recognition function has been developed.

An image analyzing technique includes a function of detecting a moving object from an image or a function of analyzing a behavior of the moving body. The image analyzing technique increases an efficiency of an image surveillance system since the image analyzing technique may replace or assist manpower required for managing a security system that detects trespassers and thefts or monitors a moving object.

A camera tampering detection system, as one of image analyzing techniques, is used for detecting an installed surveillance camera if the camera is artificially manipulated, damaged, or a view of the camera is blocked by objects such as blowing leaves.

The camera tampering detection system notifies a user of unexpected problems on a facility where the camera tampering detection is installed for crime prevention such as changes of an installation location, an angle of view of a camera, view blocking of the camera or a power outage of the camera.

Also, in a general image surveillance system, images are obtained from cameras installed on several places. Image signals obtained from the cameras are simultaneously managed by a user, for convenience of management, by being connected to a digital video recorder (DVR) or network video recorder (NVR).

SUMMARY

One or more exemplary embodiments provide a method of detecting various camera tampering without error based on a ratio of a foreground region to an entire image, a sum of the largest pixel value differences among pixel value differences between adjacent pixels, or a sum of global motion vectors.

One or more exemplary embodiments also provide a camera tampering detection system that can efficiently use resources of the camera tampering detection system by pre-processing a plurality of images obtained through a plurality of channels before detecting camera tampering in each of the plurality of images.

According to an aspect an exemplary embodiment, there is provided a method of detecting camera tampering from at least one image captured by at least one camera. The method may include: performing at least one of following operations: (i) detecting a size of a foreground region in an image, and determining whether a first condition, that the size exceeds a first reference value, is satisfied; (ii) detecting change of a sum of the largest pixel value differences among pixel value differences between adjacent pixels in selected horizontal lines of the image, according to time, and determining whether a second condition, that the change lasts for a predetermined time period, is satisfied; and (iii) adding up a plurality of global motion vectors with respect to a plurality of images, and determining whether a third condition, that a sum of the plurality of global motion vectors exceeds a second reference value, is satisfied; and determining that camera tampering has occurred if the first condition is satisfied when operation (i) is performed, if the second condition is satisfied when operation (ii) is performed, and if the third condition is satisfied when operation (iii) is performed.

If the at least one of the following operations includes operation (ii), operation (ii) may include: applying a first weight to an average of sums of the largest pixel value differences in a plurality of images up to a previous image and applying a second weight to a sum of the largest pixel value differences in a current image; calculating a weighted average of the largest pixel value differences by adding up the first weight applied average and the second weight applied sum; and determining whether the second condition, that the change lasts for the predetermined time period, is satisfied by using the weighted average.

Operation (ii) may further include determining whether the weighted average falls below a third reference value, and the determining whether the second condition, that the change lasts for the predetermined time period, is satisfied may be performed if the weighted average falls below the third reference value A sum of the first weight and the second weight may be set to one (1).

The sum of the global motion vectors may include at least one of a sum of horizontal directional components of the global motion vectors and a sum of vertical directional components of the global motion vectors.

The method of detecting camera tampering may further include: receiving a plurality of images, including the at least one image, of a monitored region captured by a plurality of cameras, including the at least one camera, through a plurality of channels, respectively; combining the plurality of images into a single image; pre-processing the single combined image by treating the plurality of images as a single image; and dividing the pre-processed single combined image into a plurality of pre-processed images, wherein each of the at least one of the following operations is performed with respect to each of the pre-processed images.

The pre-processing may include at least one of image size conversion, color space conversion and color dimension conversion.

If the at least one of the following operations include operation (i), the method of detecting camera tampering may further include detecting a foreground region of each of the plurality of pre-processed images, on which operation (i) is performed, by detecting a foreground region from the single combined image.

The at least one of the following operations may include operations (ii) and (iii).

The at least one of the following operations may include operations (i) and (ii), or operations (i) and (iii).

The at least one of the following operations may include all of operations (i), (ii) and (iii).

According to an aspect of another exemplary embodiment, there is provided a camera tampering detection system which detects camera tampering from at least one image captured by at least one camera. The system may include: an image analysis unit comprising at least one of the following units: (i) a foreground ratio detection unit which detects a size of a foreground region in an image, at a given time, and determines whether a first condition, that the size exceeds a first reference value, is satisfied; (ii) a pixel value difference detection unit which detects change of a sum of the largest pixel value differences among pixel value differences between adjacent pixels in selected horizontal lines of the image, according to time, and determines whether a second condition, that the change lasts for a predetermined time period, is satisfied; and (iii) a global motion detection unit which adds up a plurality of global motion vectors with respect to a plurality of images, and determines whether a third condition, that a sum of the plurality of global motion vectors exceeds a second reference value, is satisfied, wherein the image analysis unit determines that camera tampering has occurred if the first condition is satisfied when the image analysis unit comprises the foreground ratio detection unit, if the second condition is satisfied when the image analysis unit comprises the pixel value difference detection unit, and if the third condition is satisfied when the image analysis unit comprises the global motion detection unit.

The at least one of the following units may include the pixel value difference detection unit, in which case the pixel value difference detection unit may perform: applying a first weight to an average of sums of the largest pixel value differences in a plurality of images up to a previous image and applying a second weight to a sum of the largest pixel value differences in a current image; calculating a weighted average of the largest pixel value differences by adding up the first weight applied average and the second weight applied sum; and determines whether the second condition, that the change lasts for the predetermined time period, is satisfied by using the weighted average.

The pixel value difference detection unit may further perform determining whether the weighted average falls below a third reference value, and perform the determining whether the second condition, that the change lasts for the predetermined time period, is satisfied if the weighted average falls below the third reference value.

A sum of the first weight and the second weight may be set to one (1).

The sum of the global motion vectors may include at least one of a sum of horizontal directional components of the global motion vectors and a sum of vertical directional components of the global motion vectors.

The camera tampering detection system may further include: an image input unit which receives a plurality of images, including the at least one image, of a monitored region captured by a plurality of cameras, including the at least one camera, through a plurality of channels, respectively; an image combination unit which combines the plurality of images into a single image; and an image unit which performs pre-processing the single combined image by treating the plurality of images as a single image; wherein the image analysis unit divides the pre-processed single combined image into a plurality of pre-processed images to detect the camera tampering with respect to each of the pre-processed images.

The pre-processing may include at least one of image size conversion, color space conversion and color dimension conversion.

The at least one of the following units may include the foreground ratio detection unit, in which case the image analysis unit may further include a foreground detection unit which detects a foreground region of each of the plurality of pre-processed images, on which operations of the foreground ratio detection unit are performed, by detecting a foreground region from the single combined image.

The at least one of the following units may include the pixel value difference detection unit and the global motion detection unit.

The at least one of the following units may include the pixel value difference detection unit and the global motion detection unit.

The at least one of the following units may include the foreground ratio detection unit and the pixel value difference detection unit, or the foreground ratio detection unit and the global motion detection unit.

According to the exemplary embodiment, the camera tampering detection system may enable to detect camera tampering without error based on a ratio of a foreground region to an entire image, a sum of the largest pixel value differences among pixel value differences between adjacent pixels, or a sum of global motion vectors.

The camera tampering detection system according to the exemplary embodiments may also enable to efficiently use resources of the camera tampering detection system by pre-processing a plurality of images obtained through a plurality of channels before detecting camera tampering in each of the plurality of images.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

In the following detailed descriptions of the exemplary embodiments, references are made to the accompanying drawings which form a part hereof, and in which is shown by way of illustration the exemplary embodiments in which the inventive concept may be practiced. These embodiments are described in sufficient detail to enable those of ordinary skill in the art to practice the inventive concept. Also, it should be understood that various exemplary embodiments consistent with the inventive concept may be different from one another, but may not be exclusive to one another. For example, a specific shape, structure, and characteristics described in one exemplary embodiment may be realized in other embodiments without departing from the spirit and scope of the inventive concept. Also, it should be understood that the location and disposition of an individual element in each of the embodiments may be changed without departing from the spirit and scope of the inventive concept. Accordingly, the detailed descriptions described below should not be construed as limiting the example embodiments set forth herein, but the scope of the inventive concept includes many aspects falling within the scope of the claims and scopes equivalent to that of the claims. Like numbers refer to like elements throughout the descriptions of the accompanying drawings.

Hereafter, in order to readily understand the inventive concept by those of ordinary skill in the art, the inventive concept will now be described more fully with reference to the accompanying drawings in which the exemplary embodiments are shown.

Figure 1:
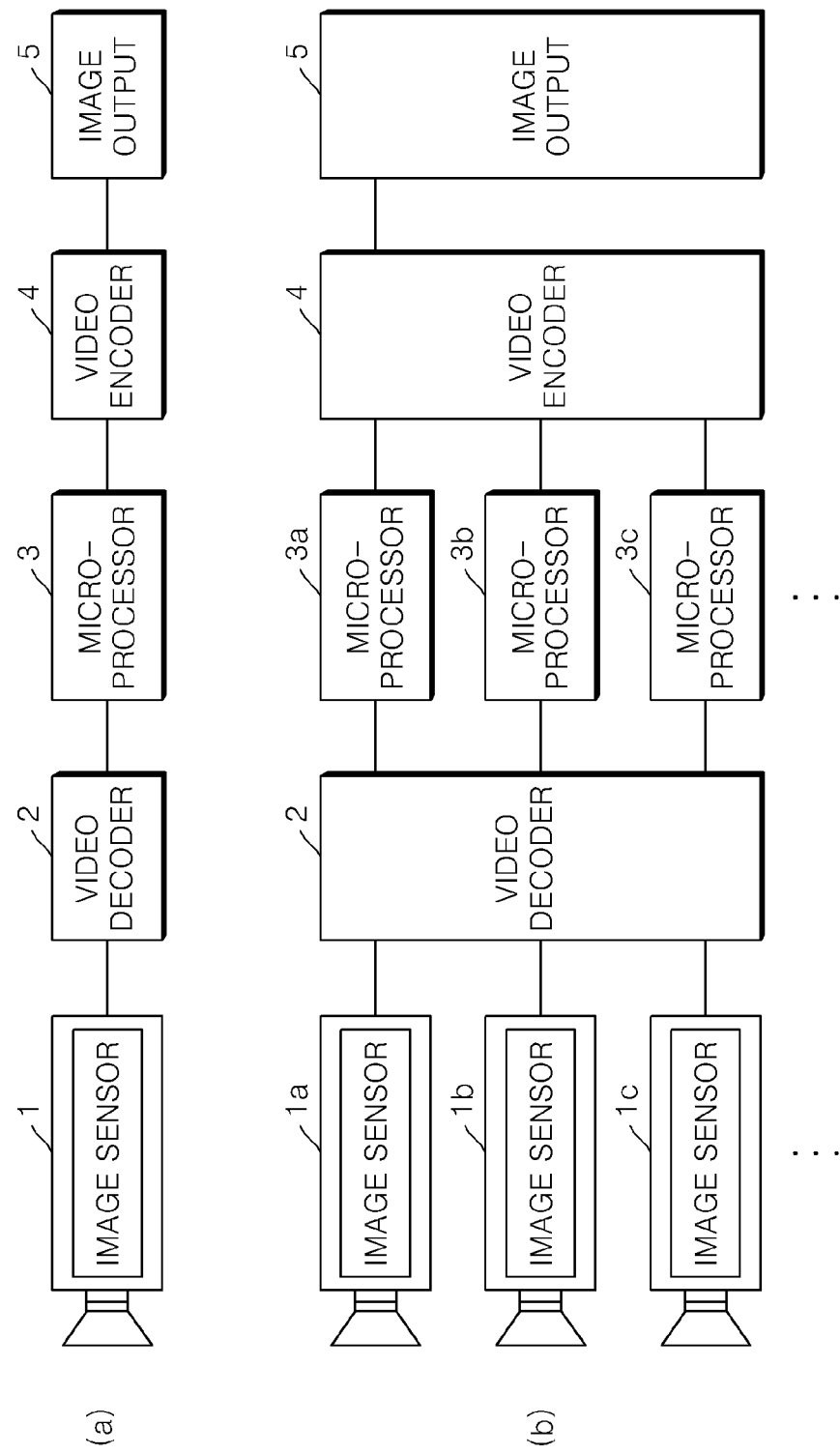
FIGS. 1A and 1B are block diagrams showing configurations of a surveillance camera system that provides a camera tampering detection function, according to exemplary embodiments.

FIG. 1A is a block diagram showing a configuration of a surveillance camera system that provides a camera tampering detection function according to an exemplary embodiment;

Referring to FIG. 1A, the surveillance camera system is configured to obtain an image of an area to be monitored by the surveillance camera system, process the image, and output the processed image. Specifically, an image of the monitored area is obtained and transformed to an electrical image signal by an image detecting device such as an image sensor included in the surveillance camera 1. Afterwards, the surveillance camera system decodes the electrical image signal obtained from the surveillance camera 1 at a video decoder 2 if the electrical image signal is encoded at the surveillance camera, and performs an image analysis that detects camera tampering at a microprocessor 3. Next, the image is output from a video encoder 4 by encoding the image.

Alternatively, in a surveillance camera system depicted in FIG. 1B, according to an exemplary embodiment, multi-channel images obtained from a plurality of surveillance cameras 1a, 1b, 1c . . . through respective channels are decoded by a video decoder 2. Afterwards, a camera tampering detection analysis is performed by microprocessors 3a, 3b, 3c . . . on the images of the respective channels.

In order for the microprocessors 3a, 3b, 3c . . . to analyze and process the multi-channel images, the microprocessors 3a, 3b, 3c . . . may be allocated to each channel to perform an image analysis and process each channel image. Alternatively, a high performance microprocessor that may perform multi-channel image analysis and process may be required. Afterwards, a video encoder 4 encodes the images on which the image analysis is performed and outputs the encoded images.

Figure 2:
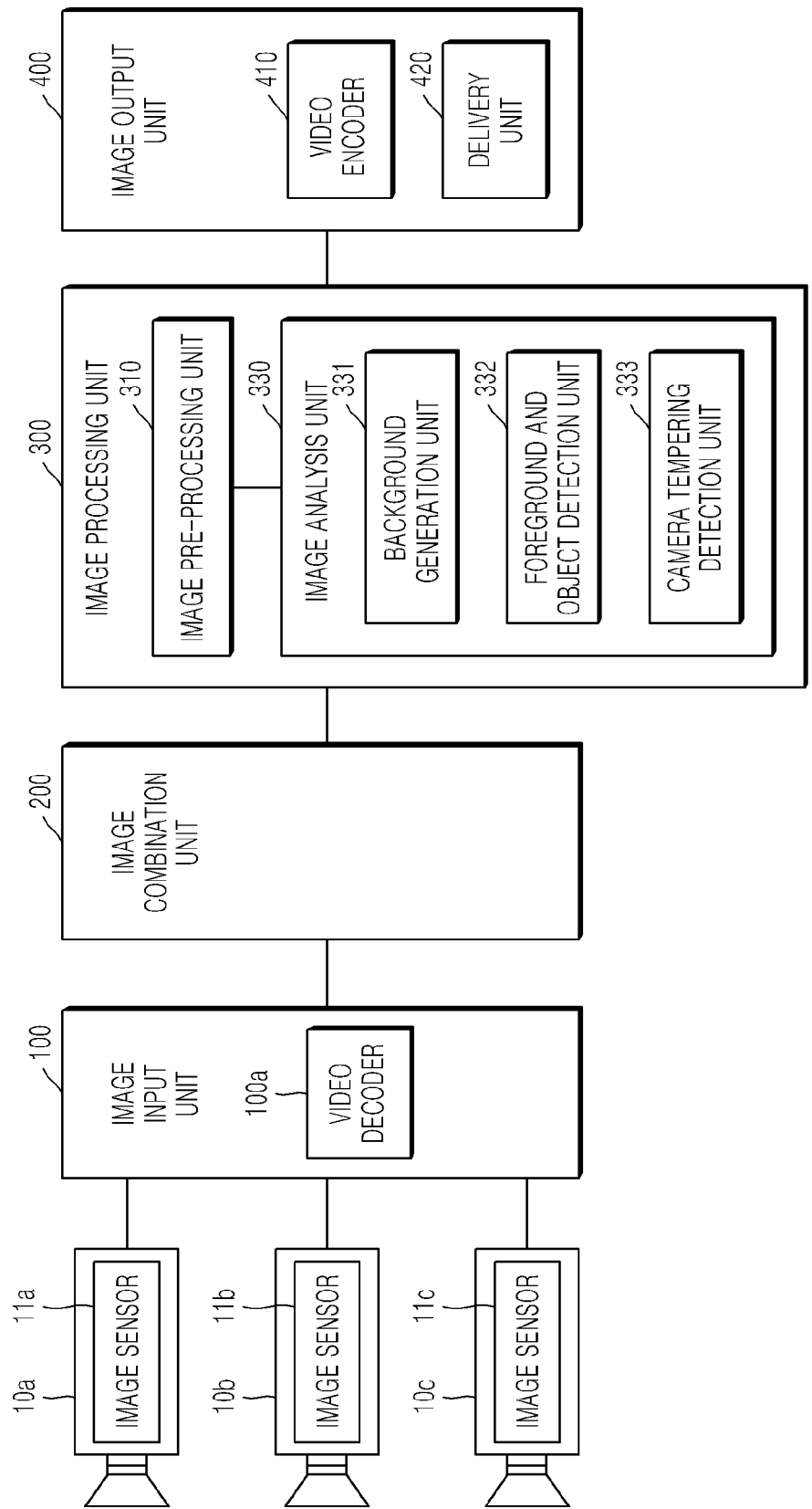
FIG. 2 is a block diagram showing a configuration of a camera tampering detection system, according to an exemplary embodiment.

FIG. 2 is a block diagram showing a configuration of a camera tampering detection system according to an exemplary embodiment.

Referring to FIG. 2, the camera tampering detection system may include cameras 10a, 10b and 10c, an image input unit 100, an image combination unit 200, an image processing unit 300 that includes an image pre-processing unit 310 and an image analysis unit 330, and an image output unit 400. Although FIG. 2 illustrates only three cameras 10a, 10b and 10c, the number of cameras is not limited to three in the current embodiment.

First, the cameras 10a, 10b and 10c are imaging devices for obtaining images of an area to be monitored by the cameras. According to the current embodiment, the cameras 10a, 10b and 10c may receive multi-channel images of the area monitored by the cameras 10a, 10b and 10c. The cameras 10a, 10b and 10c may include image sensors 11a, 11b and 11c, respectively, that transform the received images into electrical signals.

The image input unit 100 may receive analog signals of the images provided from the cameras 10a, 10b and 10c and convert the analog signals to digital signals. In FIG. 2, although the image input unit 100 corresponding to each of channels through which the images are obtained is depicted as being disposed outside the cameras 10a, 10b and 10c, the image input unit 100 may be included within each of the cameras 10a, 10b and 10c together with the image sensors 11a, 11b and 11c. Also, the image input unit 100 may include a video decoder 100a to decode the input analog image signals if the signals provided from the cameras 10a, 10b and 10c are encoded at the cameras 10a, 10b and 10.

The image combination unit 200 may combine the multi-channel images provided from the image input unit 100 into a single image. If the multi-channel images are combined into a single image, system resources may be effectively used when camera tampering detection is performed by the image processing unit 300, as will be described below. The image combination unit 200 combines the multi-channel images into a single image based on the number of the multi-channel images and a user setting for outputting the multi-channel images.

However, if there is only one camera or one channel, or there are sufficient system resources for processing the multi-channel images, camera tampering detection may not need the image combination unit 200 in the camera tampering detection system.

The image processing unit 300 determines whether camera tampering has occurred from the images input from the image combination unit 200. Each of the input images may be an image which is generated by combining multi-channel images. The image processing unit 300 includes the image pre-processing unit 310 and the image analysis unit 330 which includes a background generation unit 331, a foreground and object detection unit 332, and a camera tampering detection unit 333.

The image pre-processing unit 310 performs pre-processing required for performing an image analysis on the input images. The pre-processing may include image size conversion, color space conversion and color dimension conversion. As described above, when multi-channel images are input and pre-processing is performed on the multi-channel images combined into a single image by the image combination unit 200, the processing speed may be increased compared to a case that all of the multi-channel images are separately processed.

The image analysis unit 330 performs a camera tampering detection analysis based on the images pre-processed at the image pre-processing unit 310. The camera tampering detection is performed by the background generation unit 331, the foreground and object detection unit 332, and the camera tampering detection unit 333 that constitute the image analysis unit 330. The image analysis unit 330 may detect camera tampering with respect to the single images each of which is a combination of multi-channel images combined by the image combination unit 200. However, according to the current embodiment, camera tampering detection may be performed with respect to each channel, that is, each of the multi-channel images combined into the single image for the pre-processing at the image pre-processing unit 310.

The background generation unit 331 detects a region where there is no change in the monitored area, that is, a region that is determined as a background by using the pre-processed image. As methods of detecting the background, various methods may be used, such as a pixel value difference between images, a local binary patterns (LBP) histogram, a Gaussian mixed model, etc.

The foreground and object detection unit 332 detects a moving region except the background from the pre-processed image in the monitored area.

The camera tampering detection unit 333 determines whether an event is generated in each channel, and then, detects camera tampering in a single combined image. Since the camera tampering detection requires detailed image information for each channel, the camera tampering detection is performed with respect to each of the channels.

The camera tampering detection unit 333 includes a foreground ratio detection unit 333a, a pixel value difference detection unit 333b, and a global motion detection unit 333c. A practical configuration in which the camera tampering detection unit 333 detects camera tampering in an image will be described below.

Finally, the image output unit 400 outputs an image analysis result, that is, a camera tampering detection result, of each of the channels with displaying a combined single image. If the image analysis unit 330 detects camera tampering, the image output unit 400 not only outputs the combined single image itself but also may notify user of the tampering camera detection result output by the image analysis unit 330 in various forms such as a video or audio alarm.

The image output unit 400 includes a video encoder 410 and a delivery unit 420. The video encoder 410 re-encodes the combined single image to be able to be delivered, and the delivery unit 420 generates and delivers an output signal of the combined single image to a user through an external device.

Figure 3:
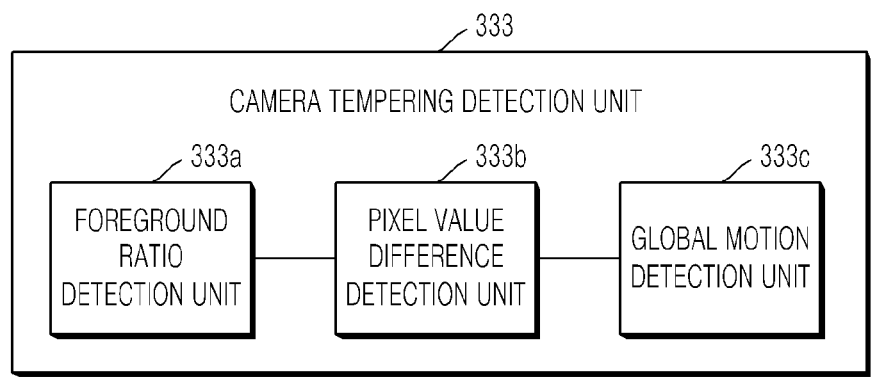
FIG. 3 is a block diagram showing an inner configuration of an image analysis unit of the camera tampering detection system, according to an exemplary embodiment.

FIG. 3 is a block diagram showing a configuration of the camera tampering detection unit 333 according to an exemplary embodiment.

Referring to FIG. 3, the camera tampering detection unit 333 includes the foreground ratio detection unit 333a, the pixel value difference detection unit 333b, and the global motion detection unit 333c.

The foreground ratio detection unit 333a calculates a ratio of a foreground to an entire image of the monitored area in a channel by using a foreground region detected by the background generation unit 331 and the foreground and object detection unit 332. Assuming that F is the number of pixels corresponding to the foreground region and T is the number of total pixels of an entire image of a channel for the monitored area, the ratio of the foreground region to the entire image may be expressed in Equation 1 as below.

$$\text{Ratio}(\%) = (F/T) \times 100 \quad (1)$$

If the ratio of the foreground region to the entire image is greater than a reference value at a given time, it indicates that an event has occurred, such as a severe change of a camera angle. In general, there are numerous reasons for changing the foreground ratio in a camera. The ratio of the foreground region may be changed when a moving object such as an animal appears within the monitored area or whiffling of tree branches by the wind. However, since occurrence of such event is mostly limited to a local region in the monitored area, change of a ratio of the foreground region may not be large.

However, if the angle of a camera is shifted to another angle, such as camera tampering or the camera is covered by a certain object, it is detected that the ratio of the foreground region has changed. Accordingly, the foreground ratio detection unit 333a determines that camera tampering has occurred when a severe change of the foreground ratio has occurred. According to another exemplary embodiment, the foreground ratio detection unit 333a may calculate change of a foreground ratio over a plurality of images, and determines that camera tampering has occurred if the change exceeds a predetermined value. According to still another exemplary embodiments, the foreground ratio detection unit 333a may detect particular characteristics, e.g., dimension, color, etc., of a foreground in an image, and determines that camera tampering has occurred if the characteristics satisfies a predetermined condition.

The pixel value difference detection unit 333b determines that camera tampering has occurred if it detects a change in a pixel value difference over a plurality of images or image frames of the monitored area obtained at different times and the change lasts over a predetermined time period.

Specifically, the pixel value difference detection unit 333b first extracts the largest pixel value difference among pixel value differences between adjacent pixels in each of selected horizontal lines of an image. Next, the pixel value difference detection unit 333b adds up the largest pixel value differences in the selected horizontal lines in each of a given number of images to obtain a sum of the largest pixel value differences in each of the given number of images. Here, if the largest pixel value differences in each of the selected horizontal lines in an $n^{th}$ image are $M_{n,1}, M_{n,2}, M_{n,3} \ldots M_{n,t}$, respectively, a sum of the largest pixel value differences, that is $S_n$, may be expressed in Equation 2 as below.

$$S_n = M_{n,1} + M_{n,2} + M_{n,3} + \ldots M_{n,t-1} + M_{n,t}, \quad (2)$$

where t is the number of the selected or entire horizontal lines.

Next, the pixel value difference detection unit 333b obtains a weighted average of sums of the largest pixel value differences, that is, a weighted average of $S_n$ values, over the given number of images, that is, n images. Specifically, the weighted average is obtained by calculating an average of sums of the largest pixel value differences up to the $(n-1)^{th}$ image and updating the average at a following image, that is the $n^{th}$ image. For example, the average of $S_n$ values may be obtained by applying respective weights to a sum of the largest pixel value differences in the $n_{th}$ image and to the average of sums of the largest pixel value differences up to the $(n-1)^{th}$ image.

The weighted average of $S_n$ values over n images or up to the $n^{th}$ image may be expressed in Equation 3 as below.

$$S_{avr,n} = S_{avr,n-1} \times (1-\text{weight}) + S_n \times \text{weight}, \text{where}$$
$$0 \leq \text{weight} \leq 1, \text{and } S_{avr,1} = S_1 \quad (3)$$

In Equation 4, $S_{avr,n}$ denotes a weighted average of sums of the largest pixel value differences over n images obtained by multiplying (1—a predetermined weight) to an average of sums of the largest pixel value differences up to the $(n-1)^{th}$ image and multiplying the predetermined weight to a sum of the largest pixel value differences in the $n^{th}$ image. If the $S_{avr,n}$ is updated with respect to each of the images, change in a pixel value difference over a plurality of images according to time may be detected.

The change of the $S_n$ value is observed if $S_{avr,n}$ falls below a reference value. If a certain change has occurred and disappeared in the monitored area for a short moment after stopping the update of the average value, this event indicates a momentary change like instant passing by of a big object in the monitored area. Therefore, the average updating is resumed and the determination of the change of a pixel value difference is continued.

However, if the change of the $S_n$ value lasts for more than the predetermined period of time that is preset by a user, the pixel value change detection unit 333b determines that a large change, such as a camera angle change, camera lens covering, power outage, etc. has occurred and is maintained. Therefore, the pixel value difference detection unit 333b determines such change as occurrence of camera tampering.

Figure 4:
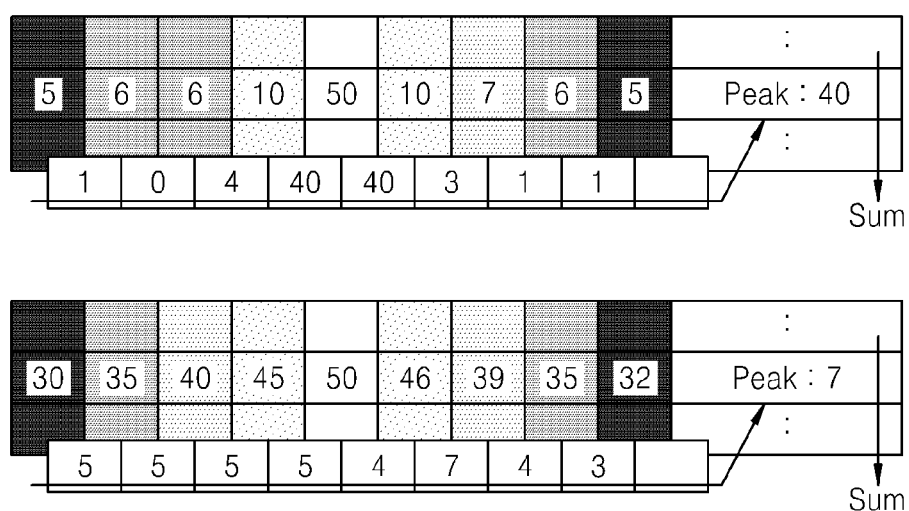
FIG. 4 is a drawing showing an example of obtaining a sum of the largest pixel value differences, according to an exemplary embodiment.

FIG. 4 illustrate an example of obtaining a sum of the largest pixel value differences after obtaining each of the largest pixel value differences, according to an exemplary embodiment.

Referring to FIG. 4, the pixel value difference detection unit 333b calculates pixel value differences between adjacent pixels in each of selected horizontal lines of an image. That is, if pixels values are 5, 6, 6, 10, 50, etc. in one horizontal line of the image, the pixel value difference detection unit 333b calculates pixel value differences between the adjacent pixels which are 1, 0, 4, 40, etc. In this horizontal line of the image, the largest pixel value difference is 40.

In the same manner, if the pixel values in another horizontal line of the image are 30, 35, 40, 45, 40, 46, 39, etc., the pixel value differences calculated by the pixel value difference detection unit 333b are 5, 5, 5, 5, 4, 7, etc. In this horizontal line of the image, the largest pixel value difference is 7.

The pixel value difference detection unit 333b adds up the largest pixel value differences in all of the selected horizontal lines in the image, as shown in FIG. 4.

Figure 5:
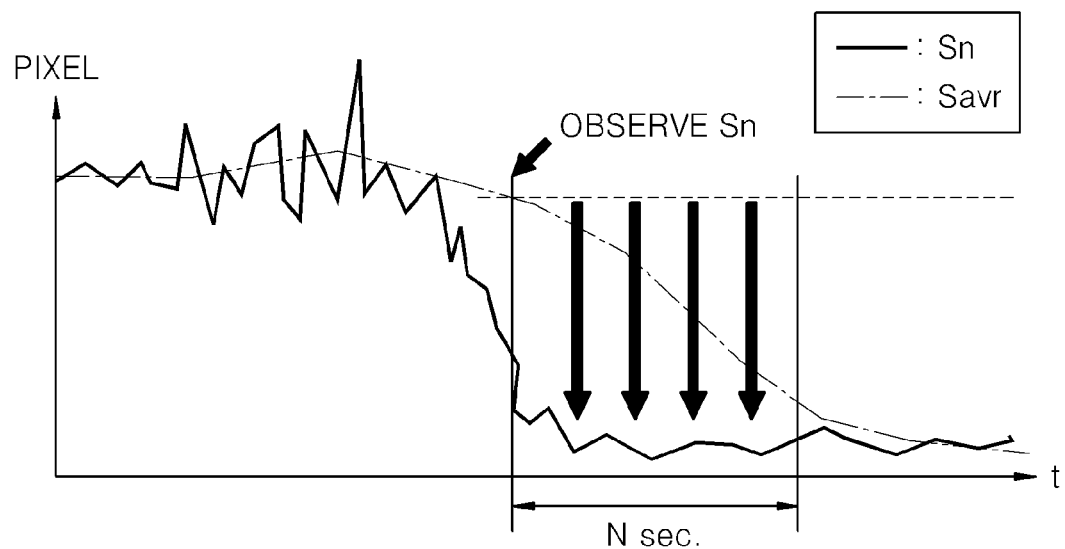
FIG. 5 is a graph showing change of a weighted average of the largest pixel value differences, according to an exemplary embodiment.

FIG. 5 is a graph showing changes of a sum of the largest pixel value differences and a weighted average of sums of the largest pixel value differences, according to an exemplary embodiment.

Referring to the graph of FIG. 5, the x-axis indicates time, the y-axis indicates a sum of the largest pixel value differences, that is $S_n$ and a weighted average of sums of the largest pixel value differences, the dashed dotted line indicates change of $S_{avr,n}$, and the solid line indicates change of the $S_n$ value. The change of $S_{avr,n}$ is indicated by a smooth graph shape since $S_{avr,n}$ is a weighted average of $S_n$ values up to the $n^{th}$ image.

As shown in the graph, if $S_{avr,n}$ falls below a reference value, the pixel value difference detection unit 333b observes the $S_n$ values, and if the $S_n$ value is maintained for a predetermined period of time, the pixel value difference detection unit 333b determines that camera tampering has occurred.

The global motion detection unit 333c obtains global motion vectors from input images of a channel for a predetermined time period, and adds up the calculated global motion vectors. When an absolute value of a sum of the global motion vectors exceeds a reference value, the global motion detection unit 333c determines that camera tampering has occurred in a camera of the channel. The global motion vector denotes an entire region vector that is a sum of motion vectors calculated in a plurality of regions. That is, the global motion detection unit 333c considers that the camera is manipulated artificially or non-artificially when there is a large change in motion or a continuous change occurs, and thus, determines that camera tampering has occurred in the camera of the channel.

When a global motion vector is obtained from input images, various methods, such as a method of using an edge component or a method of using an overflow value may be used. The global motion detection unit 333c may detect a degree of motion in up and down directions and left and right directions from the global motion vector.

When components of global motion vectors in left and right directions obtained for a predetermined time (from time 1 to time t) with reference to a reference point are $x_1, x_2, x_3 \ldots x_t$, respectively, and components of the global motion vectors in up and down direction are $y_1, y_2, y_3 \ldots y_t$, respectively, a sum of the global motion vectors for the predetermined time t may be expressed in Equation 4 as below.

$$S_x = x_1 + x_2 + x_3 + \ldots + x_t \quad (4)$$

$$S_y = y_1 + y_2 + y_3 + \ldots + y_t \quad (4)$$

Referring to Equation 4, as $S_x$, and $S_y$ converge to zero, it is determined that possibility of camera tampering is low. That is, if a global motion vector, specifically an x-component of the global motion vector, $x_1=-1$ at $t=1$ and another global motion vector, specifically an x-component of the other global motion vector, $x_2=+1$ at $t=2$, then $S_x=0$, which indicates that camera tampering has not occurred at least in the left and right directions.

That is, as the values of $S_x$ and $S_y$ converge to zero, the position of a camera may be changed instantly up and down and left and right due to environmental reasons such as strong wind, heavy snow, and heavy rain. Accordingly, the global motion detection unit 333c determines that the camera is intentionally manipulated if the $S_x$ or $S_y$ value increases only in one direction, that is (+) direction or (−) direction, and thus, determines that camera tampering has occurred.

Figure 6:
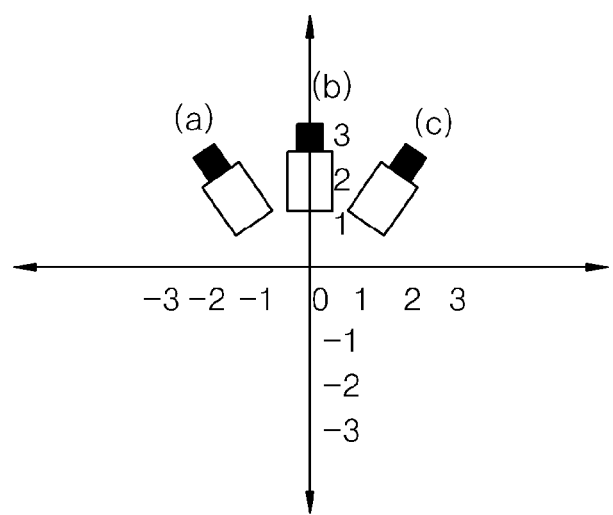
FIG. 6 is a schematic drawing showing a method of calculating global motion vectors according to angles of a camera, according to an exemplary embodiment.

FIG. 6 is a schematic drawing showing a method of calculating global motion vectors according to angles of a camera, according to an exemplary embodiment.

Referring to FIG. 6, the global motion detection unit 333c may obtain a global motion vector from change of an angle of a camera which has occurred for a predetermined time. When the camera is positioned in (b) direction which is a reference point or direction, global motion vector obtained from the camera at this position is 0. However, the global motion detection unit 333c may assume the global motion vector as −2 when the camera is positioned in direction as (a). Further, the global motion detection unit 333c may assume the global motion vector as +2 when the camera is positioned in direction (c). At this point, when the camera position has changed from (b) to (a) to (c), the $S_x$ is 0. Thus, the global motion detection unit 333c may determine that camera tampering has not occurred.

When there are a plurality of surveillance cameras, in order to detect camera tampering, a plurality of image processing apparatuses for processing multi-channel images may be needed, or a high performance image processing apparatus that can process the multi-channel images in a single apparatus may be needed. However, the camera tampering detection system according to the current exemplary embodiment may process a plurality of multi-channel images by combining into a single image.

Figure 7:
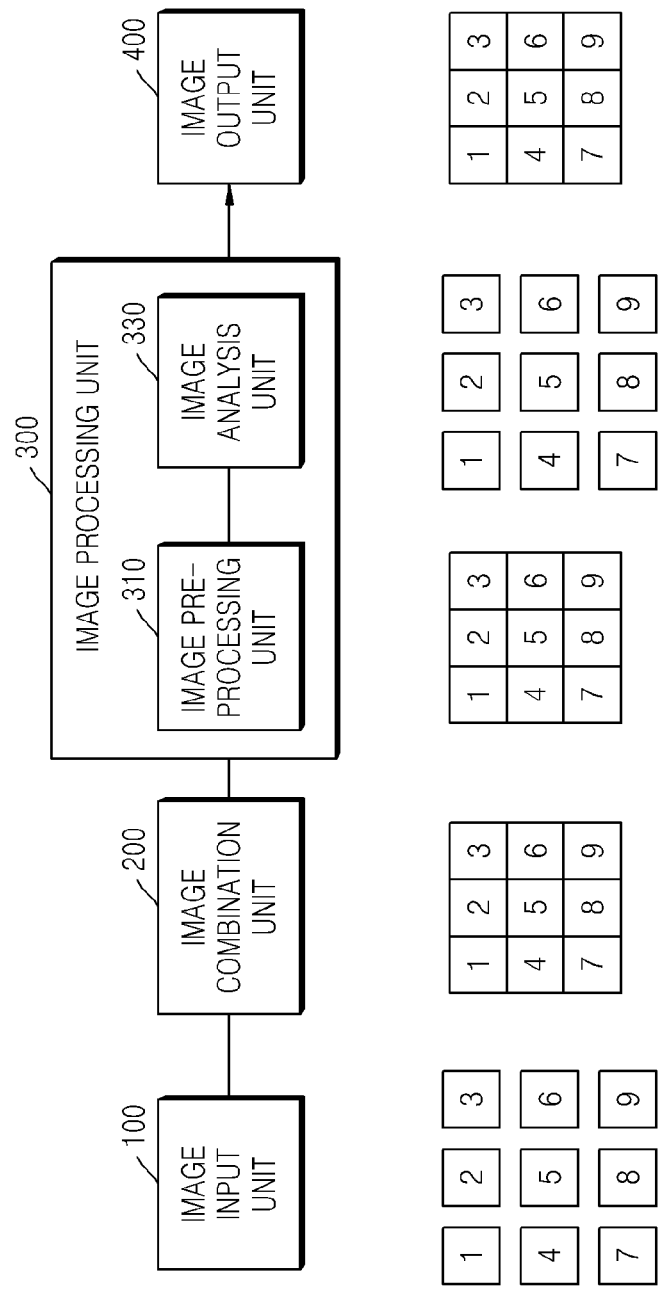
FIG. 7 is a block diagram showing a process of analyzing an image by combining images, according to an embodiment.

FIG. 7 is a block diagram showing a process of analyzing an image by combining images, according to an exemplary embodiment.

FIG. 7 illustrates how the elements of the camera tampering detection system according to the current embodiments process multi-channel images. Referring to FIG. 7, it is shown that nine individual images are input to the image input unit 100. Each of the images is obtained from a camera of a corresponding channel. The image input unit 100 decodes each of the images after receiving the images if the images are encoded.

The image combination unit 200 combines the multi-channel images received by the image input unit 100 into a single image. In FIG. 7, the image combination unit 200 generates a single image by combining nine images. The method of combining images may be performed according to a rule preset by a user. The larger the number of images to be combined, the number of system resources required for image analysis may be reduced, and thus, an efficient image analysis may be performed.

The images combined by the image combination unit 200 are transmitted to the image processing unit 300 for detecting camera tampering. First, the image pre-processing unit 310 performs pre-processing of the images before analyzing the images combined into a single image by using the image combination unit 200. At this point, the image pre-processing unit 310 may perform the pre-processing at once since the combined image is a single image. For example, in FIG. 7, the image pre-processing unit 310 performs the pre-processing onto all the images by treating the nine-channel images as a single image. If the image pre-processing unit 310 performs pre-processing on the images combined by the image combination unit 200, use of a number of system sources of the image processing unit 300 may be reduced compared to a case of performing pre-processing of each of the nine-channel images.

In the image analysis unit 330, whether camera tampering has occurred in each channel is determined using the pre-processed combined image, that is, a single image. Referring to FIG. 7, the image analysis unit 330 detects camera tampering with respect to each channel.

An image analysis technique for detecting camera tampering may not be applied if a size of an image is not greater than a predetermined size. However, if camera tampering detection is performed on the single image combined by the image combination unit 200, the camera tampering detection may not be properly achieved because a size of each of the channel images is not determined. Accordingly, in the image analysis unit 330 according to the current embodiment, camera tampering detection is performed with respect to each channel image. However, in order to efficiently use system resources, in other elements, such as the image pre-processing unit 310 and the image output unit 400, respective functions thereof may be performed on the combined single image.

The image output unit 400 re-encodes the combined image to deliver to an external device such as a display. The video encoding and delivery may also be achieved with respect to the combined image instead of each of the nine images as shown in FIG. 7.

Figure 8:
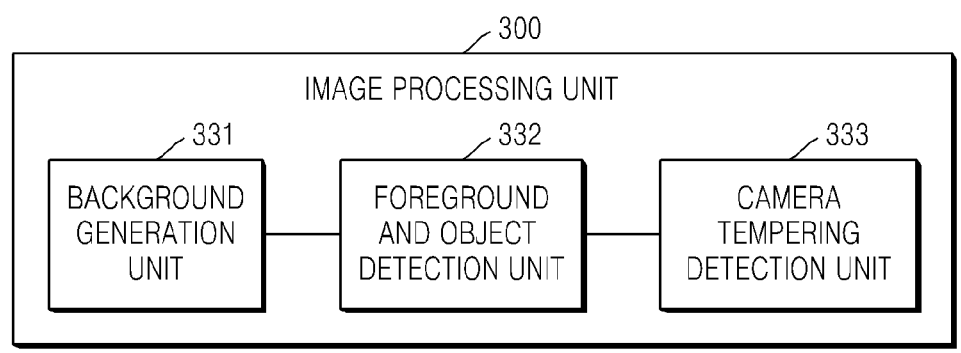
FIG. 8 is a block diagram illustrating how the elements constituting the image analyzing unit, according to an exemplary embodiment.

FIG. 8 is a block diagram illustrates how the elements constituting the image analysis unit 330 according to the current embodiment process the multi-channel images.

As described above, the image analysis unit 330 performs camera tampering detection with respect to each channel image although the image analysis unit 330 receives a combined single image from the image combination unit 200. However, the image analysis unit 330 also includes constituent elements that may perform corresponding functions even when the sizes of the images are not determined. The background generation unit 331 and the background and object detection unit 332 are those elements included in the image analysis unit 330.

Since the background generation unit 331 and the background and object detection unit 332 may perform their functions without having detailed information about each channel image, the background generation unit 331 and the background and object detection unit 332 may detect a foreground region by detecting a background region based on the combined single image. However, the camera tampering detection unit 333 may not detect camera tampering if the sizes of individual images are not determined.

Accordingly, as depicted in FIG. 8, the camera tampering detection unit 333 may perform detecting a ratio of a foreground region to an entire image of each channel, detecting pixel value differences, and calculating global motion vectors with respect to each channel image. In this case, the system resources may be efficiently used compared to a case in which all of the background generation unit 331, the foreground and object detection unit 332, and the camera tampering detection unit 333 perform respective functions with respect to each channel image.

Figure 9:
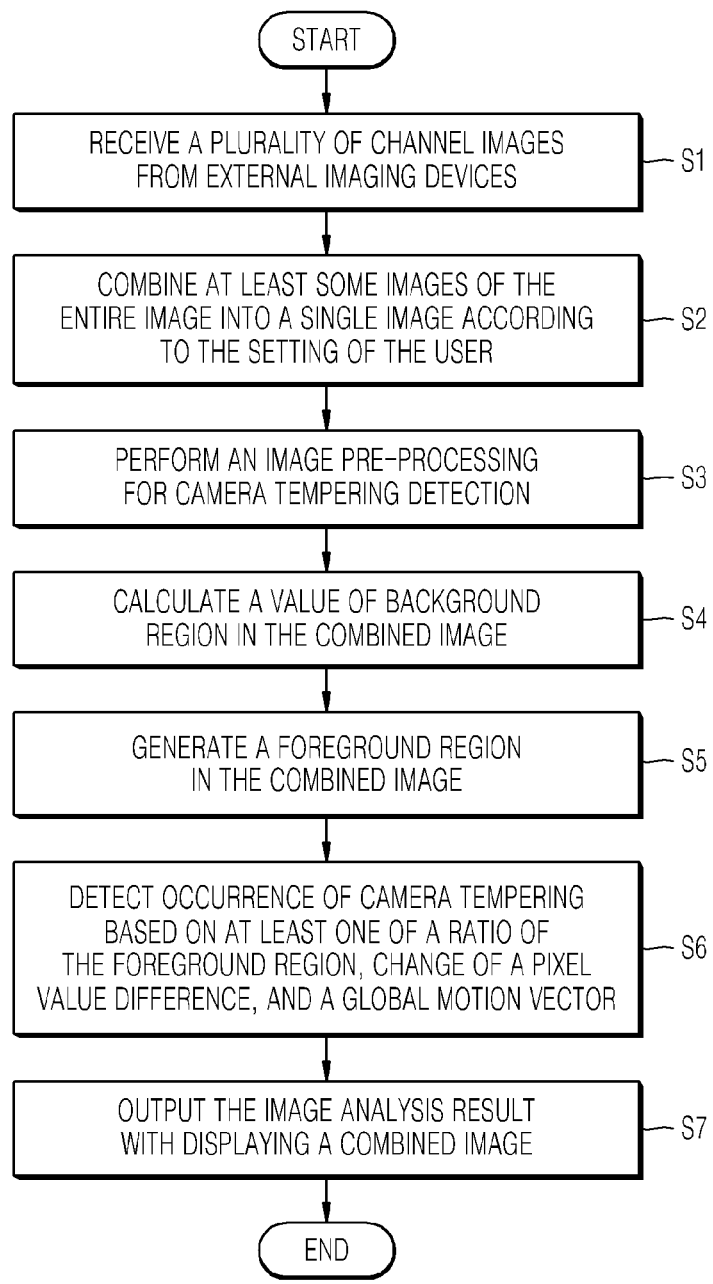
FIG. 9 is a flowchart showing a process of detecting camera tampering, according to an exemplary embodiment.

FIG. 9 is a flowchart showing a process of detecting camera tampering, according to an exemplary embodiment.

Referring to FIG. 9, the image input unit 100 receives a plurality of channel images from external imaging devices such as the cameras 10a, 10b and 10c in FIG. 2 (S1).

Next, the image combination unit 200 combines at least some images of the plurality of channel images according to a setting by a user and transmits the combined image to the image processing unit 300 (S2). The combination of the at least some of the images (S2) is not an essential operation in the current embodiment, and entire operations of detecting camera tampering may be performed with respect to each of the plurality of channel images that are not combined.

Next, the image pre-processing unit 310 of the image processing unit 300 performs image pre-processing for detecting camera tampering (S3).

The background generation unit 331 calculates a value of a background region, such as a pixel value of a region that has no changes in the combined single image (S4).

The foreground and object detection unit 332 detects a foreground region in the combined image that is determined as an actually moving object region by referring to the value of the background region calculated with respect to the combined image (S5).

Next, the camera tampering detection unit 333 detects occurrence of camera tampering with respect to each channel based on at least one of a ratio of the foreground region to an entire image at a given time, change of a pixel value difference over a plurality of images, and a global motion vector of a plurality of images (S6).

Finally, the image output unit 400 outputs the image analysis result with displaying a combined image (S7).

Figure 10:
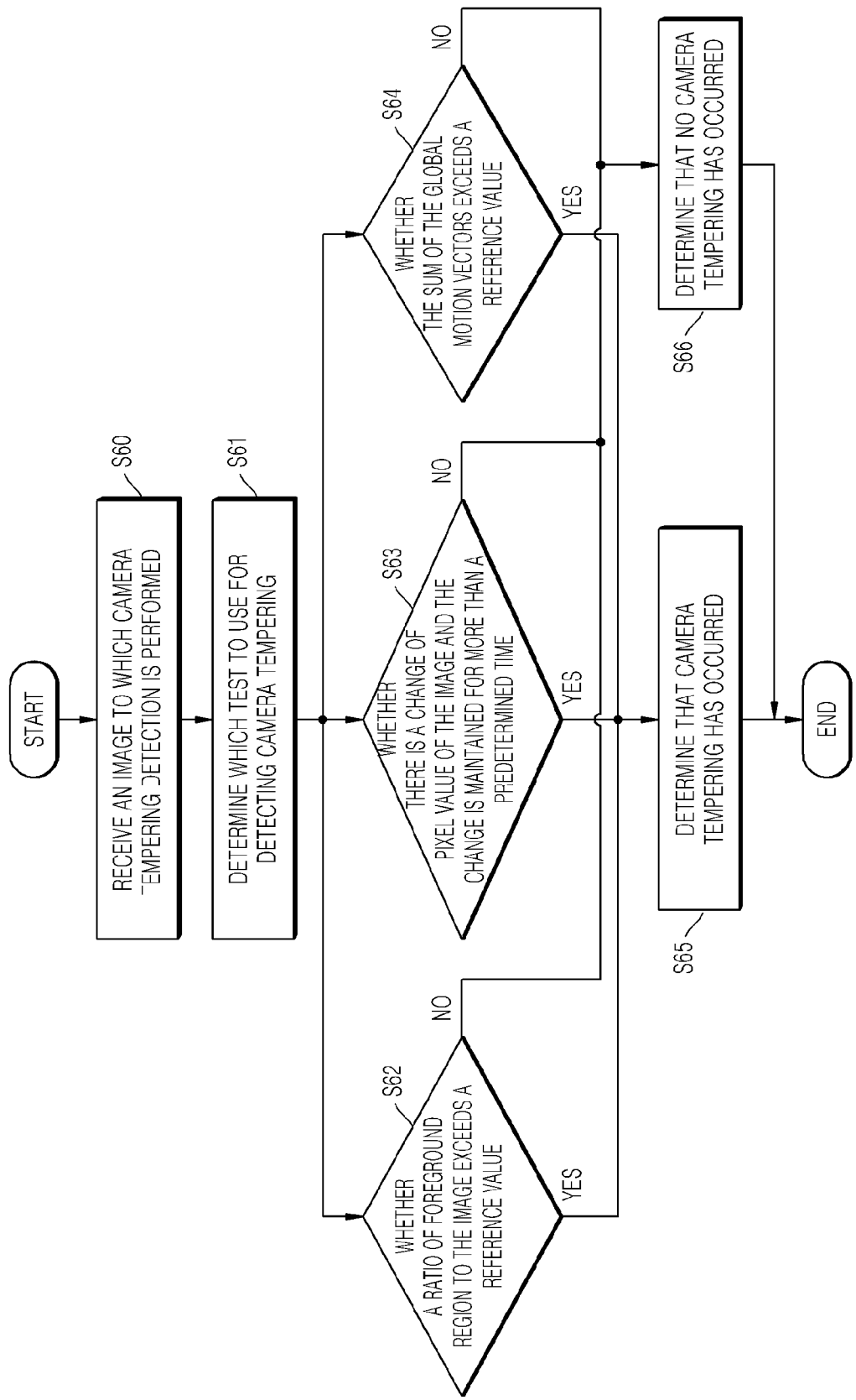
FIG. 10 is a flowchart showing a practical process of detecting a camera tampering, according to an embodiment.

FIG. 10 is a flowchart showing a process of detecting camera tampering, according to an exemplary embodiment.

First, the camera tampering detection unit 333 receives an image to which camera tampering detection is performed (S60).

After receiving the image for camera tampering detection, the camera tampering detection unit 333 determines which test to use for detecting occurrence of camera tampering among three tests which include: test (i) which detects a ratio of a foreground region to an entire image of a monitored area at a given time; test (ii) which detects change of a pixel value difference over a plurality of images of the monitored region; and test (iii) which obtains global motion vectors over the plurality of images (S61).

If it is determined to use test (i), the foreground ratio detection unit 333a determines whether a ratio of a foreground region to an entire image of a channel exceeds a reference value at a given time based on the foreground that is detected from the background generation unit 331 and the foreground and object detection unit 332 (S62). If the ratio exceeds the reference value, the foreground ratio detection unit 333a determines that camera tampering has occurred (S65). Otherwise, if the ratio does not exceed the reference value, the foreground ratio detection unit 333a determines that no camera tampering has occurred (S66).

If it is determined to use test (ii), the pixel value difference detection unit 333b determines whether change in a sum of the largest pixel value differences among pixel value differences between adjacent pixels in selected horizontal lines of an image lasts over a predetermined time period (S63). If the change lasts over the predetermined time period, the pixel value difference detection unit 333b determines that camera tampering has occurred (S65). Otherwise, that is, if the change does not last over the predetermined time period, the pixel value difference detection unit 333b determines that no camera tampering has occurred (S66).

If it is determined to use test (iii), the global motion detection unit 333c calculates and adds up global motion vectors with respect to a plurality of images of a channel, and determines whether a sum of the global motion vectors exceeds a reference value (S64). If the sum of the global motion vectors exceeds the reference value, the global motion detection unit 333c determines that camera tampering has occurred (S64). Otherwise, that is, if the sum of the global motion vectors does not exceed the reference value, the global motion detection unit 333c determines that no camera tampering has occurred (S66).

Although the current embodiment illustrates an example of detecting camera tampering using one of three tests (i), (ii) and (iii) in reference to FIG. 10, the inventive concept is not limited to this embodiment. Camera tampering may be detected using a combination of any two tests or all three tests according to another exemplary embodiment. That is, occurrence of camera tampering may be determined if at least two or all three tests have been passed.

Figure 11:
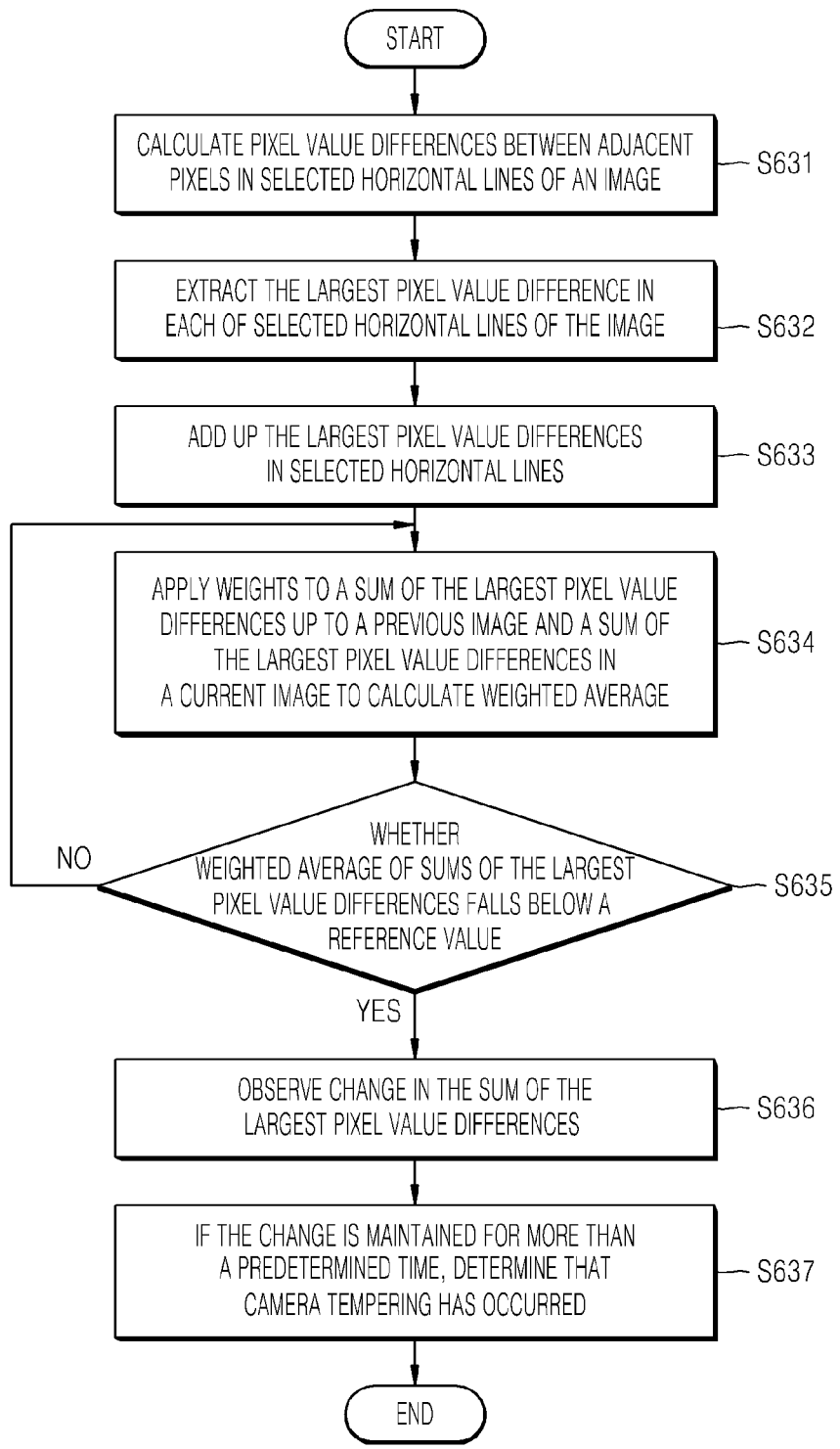
FIG. 11 is a flowchart showing a process of determining whether camera tampering has occurred by using a pixel value difference detection unit, according to an exemplary embodiment.

FIG. 11 is a flowchart showing a process of determining whether camera tampering has occurred performed by a pixel value difference detection unit 333b according to an exemplary embodiment.

The pixel value difference detection unit 333b calculates pixel value differences between adjacent pixels in each of selected horizontal lines in each of a given number of images (S631).

The pixel value difference detection unit 333b extracts the largest pixel value difference among the pixel value differences calculated in each of the selected horizontal lines of the image (S632), and adds up the largest pixel value differences in the selected horizontal lines of in each of the given number of images (S633).

Next, by applying predetermined respective weights to an average of sums of the largest pixel value differences up to a previous image and to a sum of the largest pixel value differences in a current image, the pixel value difference detection unit 333b calculates a weighted average of the largest pixel value differences by adding the two weighted values (S634).

Next, the pixel value difference detection unit 333b determines whether the weighted average of sums of the largest pixel value differences falls below a reference value (S635), and observes change in the sum of the largest pixel value differences of an input image over a predetermined time period from the moment when the weighted average falls below the reference value (S636).

Next, if the change in the sum of the largest pixel value differences is maintained for more than the predetermined period of time, the pixel value difference detection unit 333b determines that camera tampering has occurred (S637).

While the exemplary embodiments have been particularly shown and described with respect to particular aspects, the inventive concept is not limited to these embodiments. It will be understood by those of ordinary skill in the art that various changes in form and details may be made therein without departing from the spirit and scope of the inventive concept.

Therefore, the scope of the inventive concept is defined not by the detailed descriptions of the exemplary embodiments but by the appended claims, and all differences within the scope will be construed as being included in the inventive concept.

What is claimed is:

1. A method of detecting camera tampering from at least one image captured by at least one camera, the method comprising:
    performing at least one of following operations:
        (i) detecting a size of a foreground region in an image, and determining whether a first condition, that the size exceeds a first reference value, is satisfied;
        (ii) detecting change of a sum of the largest pixel value differences among pixel value differences between adjacent pixels in selected horizontal lines of the image, according to time, and determining whether a second condition, that the change lasts for a predetermined time period, is satisfied; and
        (iii) adding up a plurality of global motion vectors with respect to a plurality of images, and determining whether a third condition, that a sum of the plurality of global motion vectors exceeds a second reference value, is satisfied; and
    determining that camera tampering has occurred if the first condition is satisfied when operation (i) is performed, if the second condition is satisfied when operation (ii) is performed, and if the third condition is satisfied when operation (iii) is performed.

2. The method of claim 1, wherein the at least one of the following operations comprises operation (ii), and
    wherein operation (ii) comprises:
        applying a first weight to an average of sums of the largest pixel value differences in a plurality of images up to a previous image and applying a second weight to a sum of the largest pixel value differences in a current image;
        calculating a weighted average of the largest pixel value differences by adding up the first weight applied average and the second weight applied sum; and
        determining whether the second condition, that the change lasts for the predetermined time period, is satisfied by using the weighted average.

3. The method of claim 2, wherein operation (ii) further comprises determining whether the weighted average falls below a third reference value, and
    wherein the determining whether the second condition, that the change lasts for the predetermined time period, is satisfied is performed if the weighted average falls below the third reference value.

4. The method of claim 3, wherein a sum of the first weight and the second weight is one (1).

5. The method of claim 1, wherein the performing the at least one of the following operations comprises performing operation (iii),
 wherein the sum of the global motion vectors comprises at least one of a sum of horizontal directional components of the global motion vectors and a sum of vertical directional components of the global motion vectors.

6. The method of claim 1, further comprising:
 receiving a plurality of images, including the at least one image, of a monitored region captured by a plurality of cameras, including the at least one camera, through a plurality of channels, respectively;
 combining the plurality of images into a single image;
 pre-processing the single combined image by treating the plurality of images as a single image; and
 dividing the pre-processed single combined image into a plurality of pre-processed images,
 wherein each of the at least one of the following operations is performed with respect to each of the pre-processed images.

7. The method of claim 6, wherein the pre-processing comprises at least one of image size conversion, color space conversion and color dimension conversion.

8. The method of claim 7, wherein the performing the at least one of the following operations comprises performing operation (i), and
 wherein the operation (i) further comprises detecting a foreground region of each of the plurality of pre-processed images, on which operation (i) is performed, by detecting a foreground region from the single combined image.

9. The method of claim 6, wherein the performing the at least one of the following operations comprises performing operations (ii) and (iii).

10. The method of claim 6, wherein the performing the at least one of the following operations comprises performing operations (i) and (ii), or performing operations (i) and (iii).

11. A camera tampering detection system which detects camera tampering from at least one image captured by at least one camera, the system comprising:
 an image analysis unit comprising at least one of the following units:
 (i) a foreground ratio detection unit which detects a size of a foreground region in an image, at a given time, and determines whether a first condition, that the size exceeds a first reference value, is satisfied;
 (ii) a pixel value difference detection unit which detects change of a sum of the largest pixel value differences among pixel value differences between adjacent pixels in selected horizontal lines of the image, according to time, and determines whether a second condition, that the change lasts for a predetermined time period, is satisfied; and
 (iii) a global motion detection unit which adds up a plurality of global motion vectors with respect to a plurality of images, and determines whether a third condition, that a sum of the plurality of global motion vectors exceeds a second reference value, is satisfied,
 wherein the image analysis unit determines that camera tampering has occurred if the first condition is satisfied when the image analysis unit comprises the foreground ratio detection unit, if the second condition is satisfied when the image analysis unit comprises the pixel value difference detection unit, and if the third condition is satisfied when the image analysis unit comprises the global motion detection unit.

12. The system of claim 11, wherein the at least one of the following units comprises the pixel value difference detection unit, and
 wherein the pixel value difference detection unit performs:
 applying a first weight to an average of sums of the largest pixel value differences in a plurality of images up to a previous image and applying a second weight to a sum of the largest pixel value differences in a current image;
 calculating a weighted average of the largest pixel value differences by adding up the first weight applied average and the second weight applied sum; and
 determines whether the second condition, that the change lasts for the predetermined time period, is satisfied by using the weighted average.

13. The system of claim 12, wherein the pixel value difference detection unit further performs determining whether the weighted average falls below a third reference value, and
 wherein the pixel value difference detection unit performs the determining whether the second condition, that the change lasts for the predetermined time period, is satisfied if the weighted average falls below the third reference value.

14. The system of claim 13, wherein a sum of the first weight and the second weight is one (1).

15. The system of claim 11, wherein the image analysis unit comprises the global motion detection unit,
 wherein the sum of the global motion vectors comprises at least one of a sum of horizontal directional components of the global motion vectors and a sum of vertical directional components of the global motion vectors.

16. The system of claim 11 further comprises:
 an image input unit which receives a plurality of images, including the at least one image, of a monitored region captured by a plurality of cameras, including the at least one camera, through a plurality of channels, respectively;
 an image combination unit which combines the plurality of images into a single image; and
 an image unit which performs pre-processing the single combined image by treating the plurality of images as a single image;
 wherein the image analysis unit divides the pre-processed single combined image into a plurality of pre-processed images to detect the camera tampering with respect to each of the pre-processed images.

17. The system of claim 16, wherein the pre-processing comprises at least one of image size conversion, color space conversion and color dimension conversion.

18. The system of claim 17, wherein the image analysis unit comprises the foreground ratio detection unit, and
 wherein the image analysis unit further comprises a foreground detection unit which detects a foreground region of each of the plurality of pre-processed images, on which operations of the foreground ratio detection unit are performed, by detecting a foreground region from the single combined image.

19. The system of claim 16, wherein the image analysis unit comprises the pixel value difference detection unit and the global motion detection unit.

20. The system of claim 16, wherein the image analysis unit comprises the foreground ratio detection unit and the pixel value difference detection unit, or the foreground ratio detection unit and the global motion detection unit.

* * * * *